US 8,170,626 B2

(12) United States Patent
Morobishi

(10) Patent No.: US 8,170,626 B2
(45) Date of Patent: May 1, 2012

(54) PORTABLE ELECTRONIC DEVICE AND DISPLAY CONTROL METHOD EMPLOYED IN THE SAME

(75) Inventor: Mitsuyo Morobishi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 214 days.

(21) Appl. No.: 12/597,162

(22) PCT Filed: Apr. 25, 2008

(86) PCT No.: PCT/JP2008/058123
§ 371 (c)(1),
(2), (4) Date: Mar. 29, 2010

(87) PCT Pub. No.: WO2008/133331
PCT Pub. Date: Nov. 6, 2008

(65) Prior Publication Data
US 2010/0190529 A1 Jul. 29, 2010

(30) Foreign Application Priority Data

Apr. 26, 2007 (JP) ................................. 2007-117665

(51) Int. Cl.
*H04B 1/38* (2006.01)
(52) U.S. Cl. .................... 455/574; 379/144.08
(58) Field of Classification Search .................. 455/566, 455/574; 379/88.11, 93.23, 433.04
See application file for complete search history.

(56) References Cited

U.S. PATENT DOCUMENTS

| 7,051,287 | B1 | 5/2006 | Tsunoda |
| 2003/0162570 | A1* | 8/2003 | Suzuki et al. ................. 455/566 |
| 2004/0239973 | A1 | 12/2004 | Tanaka et al. |
| 2008/0153452 | A1* | 6/2008 | Huang et al. ................. 455/403 |

FOREIGN PATENT DOCUMENTS

| JP | 02-007090 | 1/1990 |
| JP | 03-282586 | 12/1991 |
| JP | 2000-181599 | 6/2000 |
| JP | 2001-350619 | 12/2001 |
| JP | 2002-268601 | 9/2002 |
| JP | 2003-186434 | 7/2003 |
| JP | 2003-223160 | 8/2003 |
| JP | 2003-280588 | 10/2003 |
| JP | 2004-297792 | 10/2004 |
| WO | WO-03/075255 | 9/2003 |

OTHER PUBLICATIONS

International Search Report for PCT/JP2008/058123, mailed May 27, 2008, 4 pages.

* cited by examiner

*Primary Examiner* — Tu X Nguyen
(74) *Attorney, Agent, or Firm* — Morrison & Foerster LLP

(57) ABSTRACT

Provided is a portable electronic device which can equalize deterioration of a display device and reduce a deterioration speed, even during a time when a user is performing input operation. When the user is continuously using (operating) keys other than call start and call end keys (14a, 14b), it can be estimated that the user is playing a game or editing on the portable telephone. Therefore, deterioration of a display device configuring a display section (30) is equalized and the deterioration speed is reduced by reducing luminance gradation of display of an area not related to the game and editing on the display section (30).

17 Claims, 9 Drawing Sheets

FIG. 2A
FIG. 2B
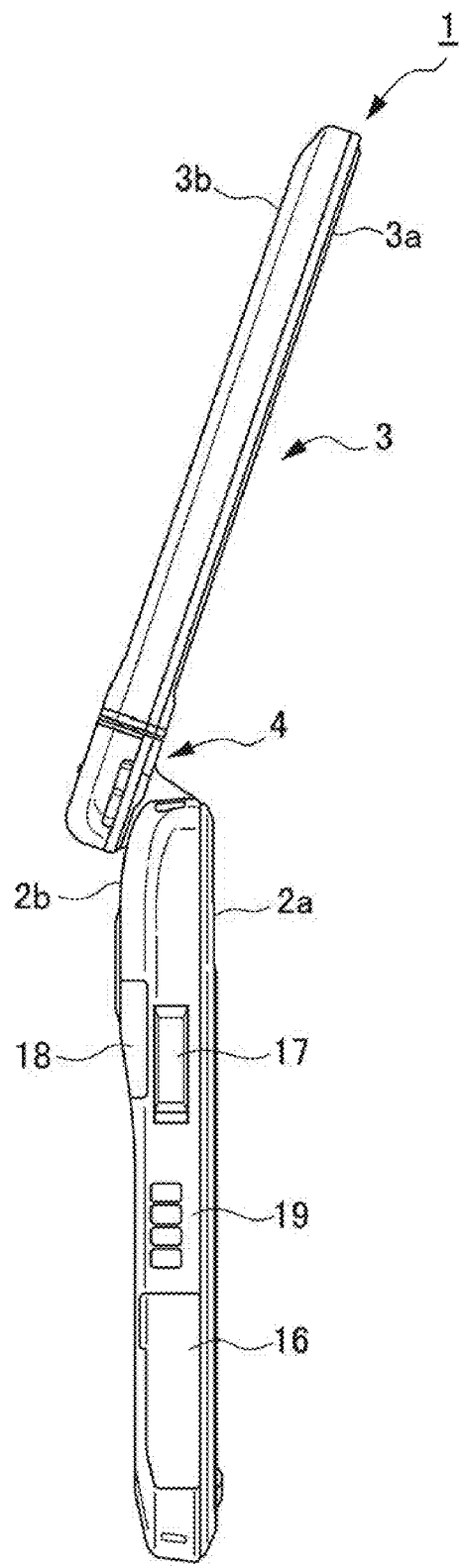
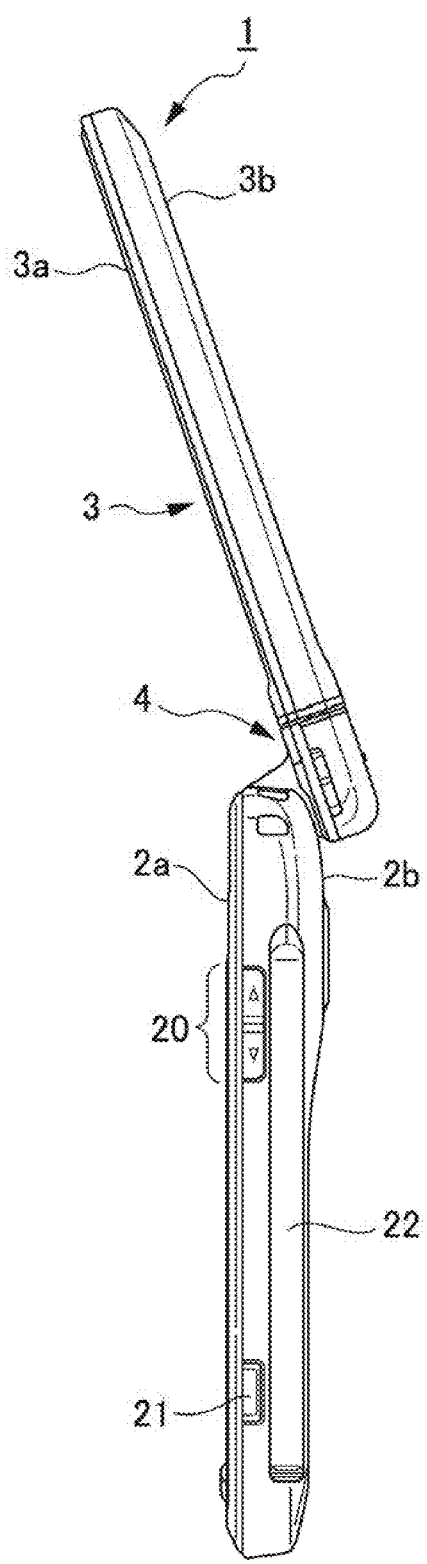

PORTABLE ELECTRONIC DEVICE AND DISPLAY CONTROL METHOD EMPLOYED IN THE SAME

CROSS-REFERENCE TO RELATED APPLICATIONS

This Application is a U.S. National Phase Application of International Application No. PCT/JP2008/058123 filed Apr. 25, 2008 which claims priority to Japanese Patent Application No. 2007-117665 filed Apr. 26, 2007, the disclosures of which are incorporated herein by reference in their entirety.

TECHNICAL FIELD

The present invention relates to a portable electronic device, and particularly to a portable electronic device and its display control method that can alleviate nonuniform deterioration (so-called burn-in) of a display.

BACKGROUND ART

In recent years, along with the Internet and E-mails becoming widespread and communication networks becoming upgraded, occasions for accessing various information from locations other than fixed locations such as an office and a home are increasing. As a result, portable electronic devices such as a cellular telephone device, a PHS (Personal Handyphone System) or a PDA (Personal Digital Assistants) are coming into wider use. Moreover, similarly to ordinary computers, the demand for colorfully displaying various information is increasing for these portable electronic devices, and the use of a color liquid crystal display is rapidly spreading.

Incidentally, as a display for such portable electronic devices, the use of an EL (Electroluminescence) display device has been attracting attention, together with a conventional liquid crystal display (LCD). The EL display device uses a substance that has a characteristic of emitting light when an electrical voltage is applied thereto, and one including an organic substance such as carbon is referred to as organic EL (hereinafter also referred to as OLED (Organic Light-Emitted Diode)).

The organic EL display device is a self-luminous display similar to a CRT (Cathode Ray Tube) and a plasma display, and has various characteristics (features) such as high brightness, high resolution, high contrast, a wide viewing angle, an ultrathin structure, and low power consumption. Accordingly, attention has been focused on its use for a portable electronic device that is small in size with the electric power consumption thereof restricted. There is a type of organic EL element in which a single element emits a single color such as green, blue and red, and a multicolor display can be configured by combining these elements. In addition, since the display response speed thereof is very high and about 1,000 times higher than that of a liquid crystal display, smooth animated images can be displayed. Furthermore, in addition to its capability of expressing tones of colors, a backlight is not required, thus a thin structure is achieved, and it is possible to further suppress power consumption depending on the usage.

However, the EL display device having such superior characteristics has a problem in that the brightness thereof decreases in proportion to the period of time for displaying (emitting light). In the EL display device, light emission of each individual EL display element is controlled, thereby configuring a color image and the like as a whole. Accordingly, in a case such as, for example, displaying a menu screen, when the same point on the display is always turned on (emitting light), the EL display element of that portion is deteriorated faster than the EL display elements of other portions. When deterioration occurs, the brightness of the portion decreases (burn-in). Therefore, a difference of a degree of deterioration arises among the EL display elements, and a definite difference among portions with high brightness and portions with low brightness appears on the display.

In the portable electronic devices as represented by a cellular telephone device, there are relatively more application purposes for displaying the same static image for a long time, such as a case of reading text information, than a case of watching an animated image. Therefore, there is a high risk of assuming a usage pattern that causes nonuniform displaying, instead of a usage pattern of equally using the entire display. Accordingly, the OLED has a problem in that, when the display aspects of the pixels configuring the display vary due to deterioration (burn-in and the like) of the display elements, this variation appears as nonuniform brightness, thereby decreasing the quality of displaying images. Moreover, in the LCD as well, burn-in of a liquid crystal would occur due to displaying for a long time, and thus there is a possibility that a problem of similar display quality deterioration occurs.

Accordingly, various terminals have been proposed in which countermeasures against the aforementioned burn-in phenomenon are taken (see Patent Documents 1 to 4, for example).

Patent Document 1 discloses a radio communication terminal in which a display speed for displaying data is set, and an image is displayed at the set speed. Patent Document 2 discloses a display unit that switches reversing display and non-reversing display when detecting a connection to an external power supply. Patent Document 3 discloses a terminal device in which a display area is divided into a plurality of display areas, which are changed depending on time. Patent Document 4 discloses a cellular telephone device in which the chromaticity coordinates of white display of an image are determined by calculation, such that the RGB rate configuring the white display portion of an image is smaller for a color corresponding to an element of which aging degradation speed for luminescence brightness is higher among each RGB light emitting element.

Patent Document 1: Japanese Unexamined Patent Application, First Publication No. 2002-268601
Patent Document 2: Japanese Unexamined Patent Application, First Publication No. 2003-186434
Patent Document 3: Japanese Unexamined Patent Application, First Publication No. 2003-223160
Patent Document 4: Japanese Unexamined Patent Application, First Publication No. 2003-280588

DISCLOSURE OF THE INVENTION

Problems to be Solved by the Invention

In the prior art, in a case in which the user is not performing an input operation for a predetermined period of time, deterioration of a display device can be equalized, and the speed of the deterioration can be decreased, by performing a screen saver display and the like. However, there have been problems in that the deterioration of a display device can not be equalized, and the speed of the deterioration can not be decreased, for a period in which the user is performing an input operation (a period such as, for example, for inputting mail sentences) (there have been no means for solving such problems).

The present invention has been made based on the aforementioned problems, and an objective thereof is to provide a portable electronic device, which makes it possible to equalize deterioration of a display device and to decrease the speed of the deterioration, even in a period in which the user is performing an input operation.

Means for Solving the Problems

In order to solve the abovementioned problems, a portable electronic device according to the present invention includes: an input operation unit including a plurality of input keys; a display unit; and a control unit that controls to change display contents of the display unit based on an instruction of the input operation unit, in which the display unit includes a first area in which operation contents of the input operation unit are reflected, and a second area in which the operation contents are not reflected, and upon detecting that a key operation other than a first key among the input keys has been continuously performed for at least a predetermined number of times, the control unit performs first brightness decreasing processing such that brightness or gradation of at least the second area of the display unit is decreased as compared to brightness or gradation of the first area.

Moreover, in the portable electronic device, it is preferable that the first key is an outgoing call key or a call end key.

In addition, in the portable electronic device, when a state in which the input operation unit is not operated continues for a predetermined period of time, it is preferable that the control unit controls the display unit to transition into a power saving mode that involves second brightness decreasing processing for decreasing brightness of the entire display unit or non-displaying processing for not performing display.

Furthermore, in the portable electronic device, when the power saving mode is canceled, it is preferable that the control unit causes display to be performed in a state in which the first brightness decreasing processing is canceled.

Moreover, in the portable electronic device, it is preferable that the second area is a notification information display area for making notification of a state of the device.

In addition, it is preferable that the portable electronic device further includes a radio unit, and it is preferable that the control unit controls the display unit to perform display on the notification information display area to include at least one symbol among a radio wave symbol showing a radio wave state of the radio unit, and a mail symbol showing presence of a mail message for which contents thereof have not yet been displayed on the display unit after being received by the radio unit.

Furthermore, it is preferable that the portable electronic device further includes a battery, and it is preferable that the control unit controls the display unit to perform display on the notification information display area including a battery symbol showing a charge of the battery.

Moreover, in the portable electronic device, it is preferable that the control unit controls the display unit to perform display on the notification information display area to include at least one symbol among a date symbol and a time symbol.

In addition, in the portable electronic device, it is preferable that the display unit is configured with a multitude of pixels including a plurality of light emitting elements, the pixels disposed in length and width directions, and it is preferable that the control unit changes display contents of the display unit by controlling a light emission state of each of the multitude of pixels.

Furthermore, it is preferable that the portable electronic device includes: a display unit that includes a first display area on which display is performed in accordance with an operation of a predetermined application program and a second display area outside the first display area; a control unit that controls to change display contents of the display unit; and an input operation unit that includes a plurality of input keys including a predetermined key for outputting an operation signal to the predetermined application program, in which, in a case where a key operation of the predetermined key being continuously performed for at least a predetermined number of times has been detected, the control unit performs brightness decreasing processing such that brightness of the second display area is decreased as compared to brightness of the first display area, or the second display area is turned off.

Moreover, in the portable electronic device, it is preferable that the predetermined key is at least one among a numeric key, a direction key and a selection operation key.

In addition, in the portable electronic device, in a case in which there is a dedicated key allocated to startup of the application program in setting by the input operation unit or in an initial state, it is preferable that the control unit performs the brightness decreasing processing corresponding to the application program allocated to the dedicated key when an operation of the dedicated key occurs.

Furthermore, in the portable electronic device, it is preferable that the control unit discontinues the brightness decreasing processing when an event for which notification should be made occurs in a state in which the brightness decreasing processing is performed.

Moreover, in the portable electronic device, it is preferable that the display unit is configured with a multitude of pixels including a plurality of light emitting elements, the pixels disposed in length and width directions, and it is preferable that the control unit changes display contents of the display unit by controlling a light emission state of each of the multitude of pixels.

In addition, it is preferable that the portable electronic device further includes a radio unit, and it is preferable that the control unit controls the display unit to perform display on the notification information display area to include at least one symbol among a radio wave symbol showing a radio wave state of the radio unit, and a mail symbol showing presence of a mail message for which contents thereof have not yet been displayed on the display unit after being received by the radio unit.

Furthermore, it is preferable that the portable electronic device further includes a battery, and it is preferable that the control unit controls the display unit to perform display on the notification information display area to include a battery symbol showing a charge of the battery.

In order to solve the abovementioned problems, provided is a display control method for a portable electronic device including: an input operation unit including a plurality of input keys; and a display unit that changes display contents based on an instruction of the input operation unit, the method including the steps of: displaying, on the display unit, a first area in which operation contents of the input operation unit are reflected; displaying, on the display unit, a second area in which operation contents of the input operation unit are not reflected; determining whether a key operation other than a first key among the input keys has been continuously performed for at least a predetermined number of times; and performing first brightness decreasing processing such that brightness or gradation of at least the second area of the display unit is decreased as compared to brightness or gradation of the first area, upon determining that a key operation other than the first key has been continuously performed for at least a predetermined number of times.

EFFECTS OF THE INVENTION

According to the present invention, deterioration (burn-in) of pixels of a display device can be equalized, and a speed of the deterioration can be decreased.

BRIEF DESCRIPTION OF THE DRAWINGS

FIG. 2A shows a left side view of a state in which the cellular telephone device is opened, and FIG. 2B shows a right side view of a state in which the cellular telephone device is opened;

Figure 1:
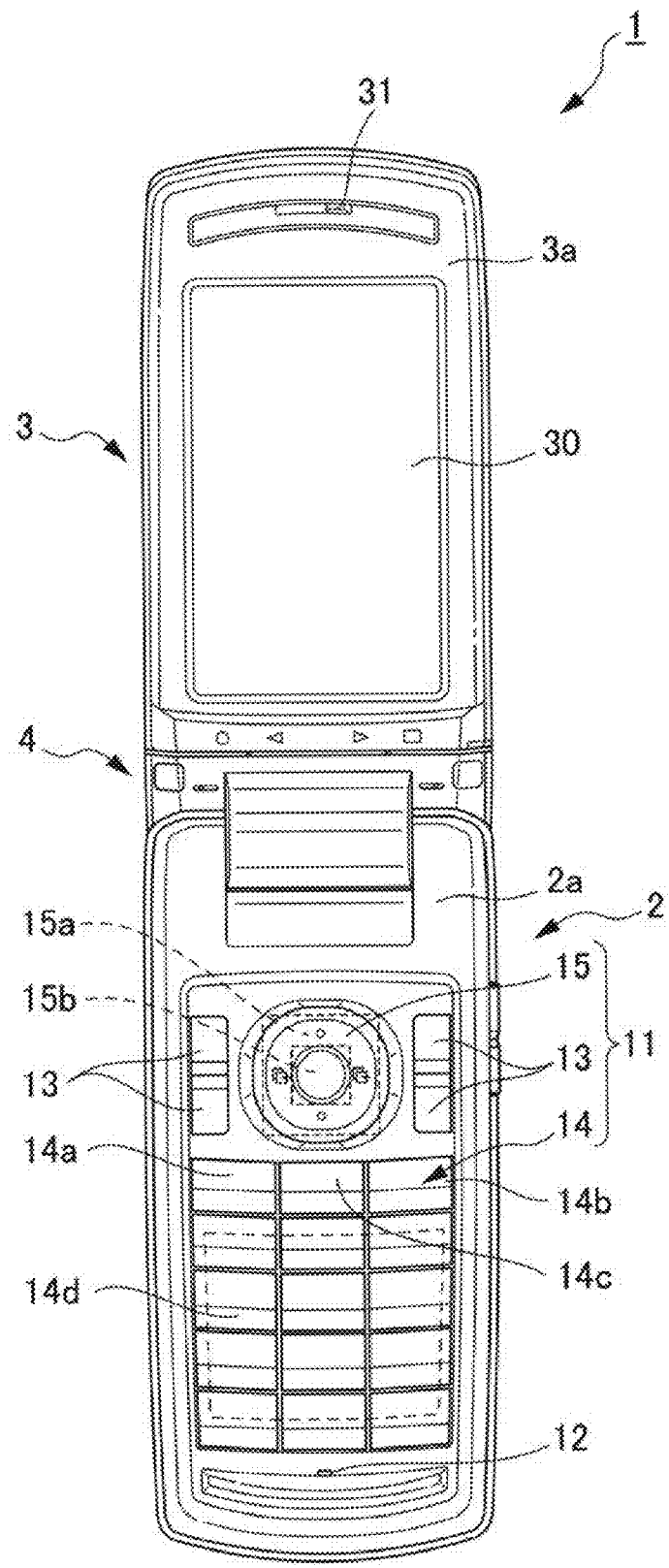
FIG. 1 shows a front view of a state in which a cellular telephone device is opened (opened state)

EXPLANATION OF REFERENCE NUMERALS 1 cellular telephone device
2 operation unit side body
2a, 3a front case
2b, 3b rear case
3 display unit side body
4 connecting portion
11 operation key set
12 microphone
23 camera unit
30 display
31 sound output unit
80, 81 antenna
100 first communication unit
101, 203 communication processing unit
200 second communication unit
201 processing unit
202 CPU
204 memory
205 sound processing unit
206 image processing unit
207 speaker
300 display-element-deterioration-controlling control unit
302 arithmetic logical unit
303 key counter
304 program ROM
305 working RAM
307 key input monitoring means
308 power saving mode transition means
309 first key operation times detecting means
310 second key operation times detecting means
311 first brightness decreasing processing means
312 second brightness decreasing processing means
320 control unit

PREFERRED MODE FOR CARRYING OUT THE INVENTION

Preferred embodiments for carrying out the present invention are hereinafter described with reference to the drawings. It should be noted that, although a cellular telephone device 1 is hereinafter described as a portable electronic device, the present invention is not limited thereto, and the portable electronic device may be a PHS (Personal Handyphone System), a PDA (Personal Digital Assistant), a portable navigation device, a notebook PC or the like.

Figure 3:
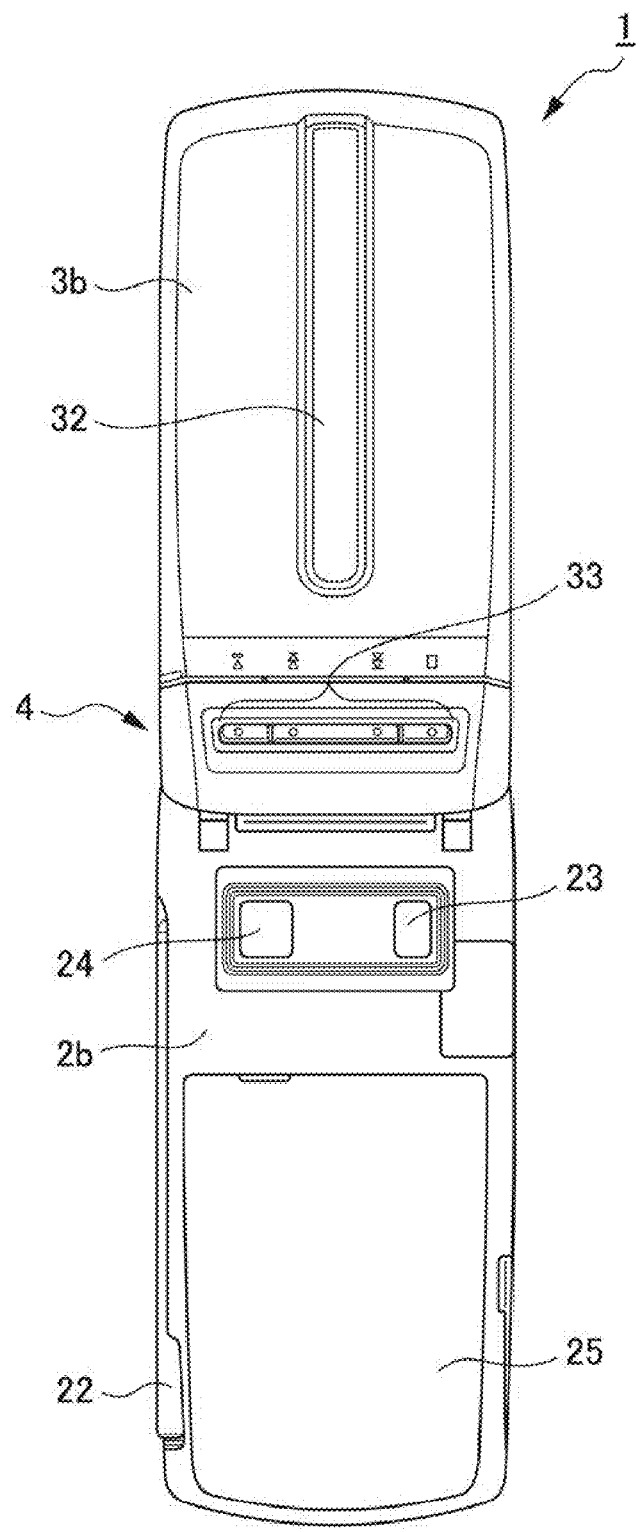
FIG. 3 shows a rear view of a state in which the cellular telephone device is opened.

A basic structure of the cellular telephone device 1 is described with reference to FIGS. 1 to 3. FIG. 1 shows a front view of a state in which the cellular telephone device 1 is opened (opened state). Moreover, FIG. 2A shows a left side view of a state in which the cellular telephone device 1 is opened, and FIG. 2B shows a right side view of a state in which the cellular telephone device 1 is opened. Furthermore, FIG. 3 shows a rear view of a state in which the cellular telephone device 1 is opened.

The cellular telephone device 1 includes an operation unit side body 2 and a display unit side body 3. The operation unit side body 2 and the display unit side body 3 are connected via a connecting portion 4 including a 2-axis hinge mechanism, thereby making it possible to transform the cellular telephone device 1 into an opened state and a closed state. Moreover, in the cellular telephone device 1, the display unit side body 3 can be switched between a front side state and a back side state in the opened state and the closed state, respectively.

Here, the closed state is a state in which both bodies are disposed so as to be mutually superimposed, and the opened state is a state in which both bodies are disposed so as not to be mutually superimposed. The front side state in the opened state is a state in which a display 30 disposed on a surface 3A in the display unit side body 3 to be described later and an operation key set 11 disposed in a front case 2a in the operation unit side body 2 are disposed so as to face the same side. The back side state is a state in which the display 30 in the display unit side body 3 and the operation key set 11 in the operation unit side body 2 are disposed so as to face opposite sides. The front side state in the closed state is a state in which the display 30 in the display unit side body 3 is disposed so as to face the operation key set 11 in the operation unit side body 2. The back side state in the closed state is a state in which the display 30 in the display unit side body 3 is disposed so as to be exposed and not face the operation key set 11 in the operation unit side body 2.

An outer surface of the operation unit side body 2 is configured with a front case 2a and a rear case 2b. The operation unit side body 2 is configured to expose, on the front case 2a side, both the operation key set (also referred to as an input operation unit) 11 and a sound input unit (microphone) 12 where the sound of the user of the cellular telephone device 1 is input when conversing. Here, the operation key set 11 is configured with: function setting operation keys 13 (also referred to as function keys) for operating various functions such as for various settings, a telephone number directory function and a mail function; input operation keys 14 (including an outgoing call key 14a, a call end key 14b, a clear key 14c and numeric keys 15d) for inputting digits of a telephone number and characters for mail; and a selection operation key 15 (including an up-down-left-right key 15a (also referred to as a direction key) and a selection key 15b) for performing selection of the various operations, scrolling in up, down, left and down directions and the like. Moreover, a microphone 12 is disposed to an outer end side that is opposite to the connecting portion 4 side in a longitudinal direction of the operation unit side body 2. In other words, the microphone 12 is disposed to one outer end side of the cellular telephone device 1 in the opened state.

In addition, predetermined functions are assigned (key assignment) to each key configuring the operation key set 11 in accordance with a transformation state such as the opened/closed state and the front/back side state of the operation unit side body 2 and the display unit side body 3, and the type of application that is running. An operation corresponding to a function assigned to each key is executed by the user depressing each key configuring the operation key set 11 of the cellular telephone device 1.

As shown in FIG. 2A, an interface 16 for transmitting and receiving data to and from an external device (e.g., a host device), a headphone/microphone terminal 17, a detachable external memory interface 18, and a charging terminal 19 for recharging a battery are provided on one side of the operation unit side body 2. It should be noted that the interface 16, the headphone/microphone terminal 17 and the interface 18 are covered with a detachable cap to protect from dust when not in use.

As shown in FIG. 2B, a pair of side keys 20, an operation key 21 used when capturing an image, and an antenna 22 for receiving a broadcast wave, in which a reception angle of waves can be adjusted, are provided on another side of the operation unit side body 2. Predetermined functions are assigned (key assignment) to the side keys 20 in accordance with a transformation state such as the opened/closed state and the front/back side state of the operation unit side body 2 and the display unit side body 3, and the type of application that is running. Here, similarly to the aforementioned case, an operation corresponding to a function assigned to the side keys 20 in the cellular telephone device 1 is executed by the user depressing the side keys 20.

As shown in FIG. 3, a camera unit 23 that takes an image of a subject and a light unit 24 that irradiates light on the subject are disposed so as to be exposed in the rear case 2b of the operation unit side body 2. The camera unit 23 and the light unit 24 are disposed to the connecting portion 4 side in the operation unit side body 2. Moreover, an opening for mounting the battery in a battery accommodating portion to be described later in detail is formed in the rear case 2b of the operation unit side body 2, and a battery lid 25 is disposed so as to cover the opening.

Furthermore, as shown in FIGS. 1 to 3, an upper end portion of the operation unit side body 2 and a lower end portion of the display unit side body 3 are connected by the connecting portion 4 including the 2-axis hinge mechanism. As shown in FIG. 3, a secondary operation key set 33 is disposed on one surface (rear surface) of the connecting portion 4 in a row in a width direction (lateral direction) of the cellular telephone device 1. Predetermined functions are assigned (key assignment) to each key configuring the secondary operation key set 33 in accordance with a transformation state such as the opened/closed state and the front/back side state of the operation unit side body 2 and the display unit side body 3, and the type of application that is running. An operation corresponding to a function assigned to each key is executed by the user depressing each key configuring the operation key set 11 of the cellular telephone device 1.

Moreover, an outer surface of the display unit side body 3 is configured with a front case 3a and a rear case 3b. As shown in FIG. 1, the display 30 of a predetermined shape for displaying a variety of information and a sound output unit 31 that outputs sound of the other party of the conversation are disposed so as to be exposed on the front case 3a of the display unit side body 3. Here, the sound output unit 31 is disposed to an outer end side that is opposite to the connecting portion 4 in a longitudinal direction of the display unit side body 3. In other words, the sound output unit 31 is disposed to another outer end side of the cellular telephone device 1 in the opened state.

In addition, as shown in FIG. 3, a sub-display 32 for displaying a variety of information is disposed so as to be exposed on the rear case 3b of the display unit side body 3.

Each of the display 30 and the sub-display 32 is configured with a liquid crystal display panel, a drive circuit that drives the liquid crystal display panel, and a light source unit such as a backlight that irradiates light from the back surface side of the liquid crystal display panel.

It should be noted that, although the cellular telephone device 1 is described as being foldable by the connecting portion 4 in the present embodiment, instead of such a flip type, the cellular telephone device 1 may be of: a slider type in which one body slides to one direction from a state in which the operation unit side body 2 and the display unit side body 3 are mutually superimposed; a rotating type (turning type) in which one body is rotated around an axis line along the direction in which the operation unit side body 2 and the display unit side body 3 are superimposed; or a straight type in which the operation unit side body 2 and the display unit side body 3 are disposed in a single body without a connecting portion.

Figure 4:
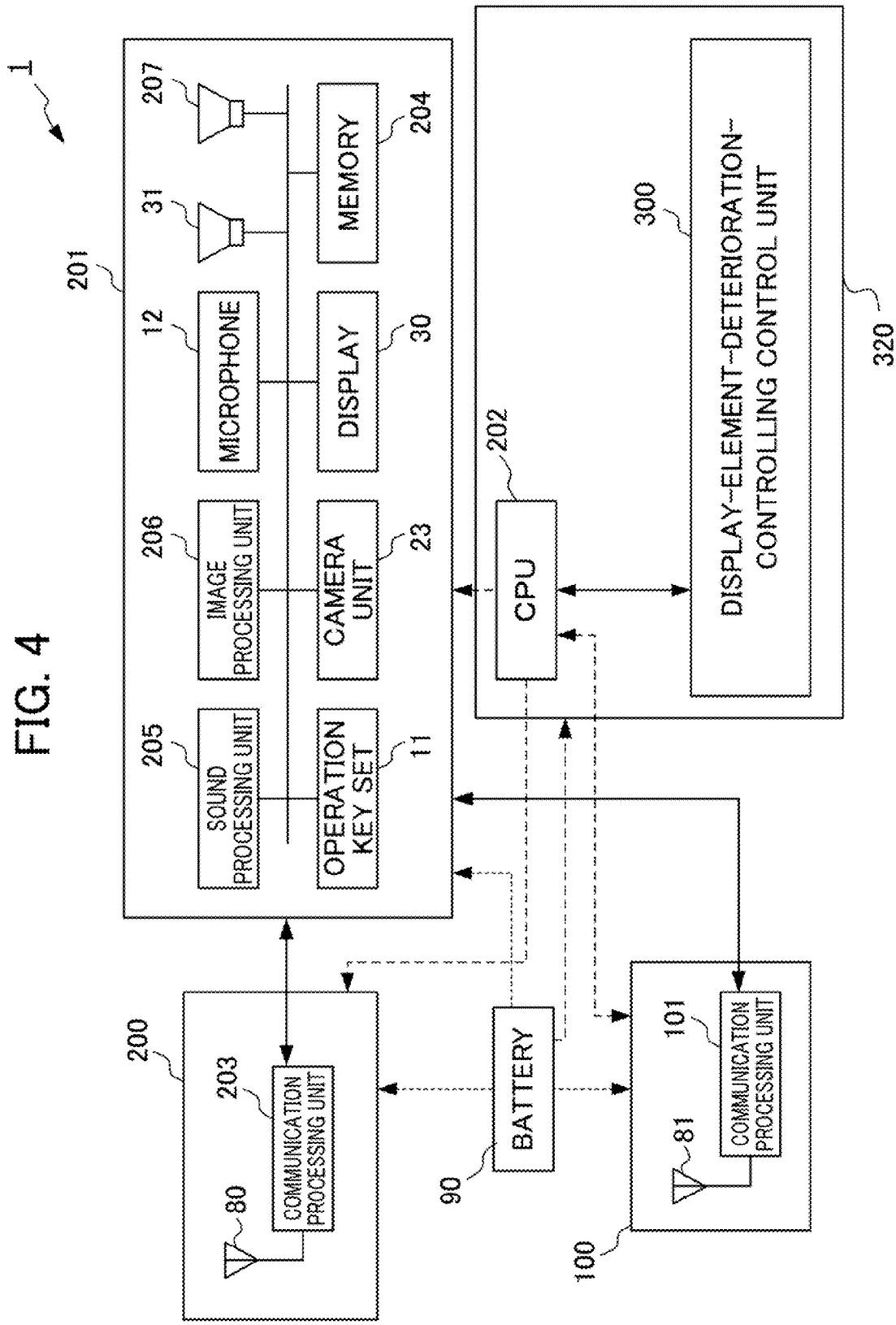
FIG. 4 is a block diagram showing functions of the cellular telephone device according to the present invention.

Next, each function of the cellular telephone device 1 is described with reference to the functional block diagram of FIG. 4. As shown in FIG. 4, the cellular telephone device 1 includes: a first communication unit (first communication means) 100 that is capable of communicating with a mobile communication network that is a communication network conforming with a first communication standard; a second communication unit (second communication means) 200 that is capable of communicating with a wireless LAN communication network that is a communication network conforming with a second communication standard; a processing unit 201 that performs predetermined processing; a CPU 202; and a display-element-deterioration-controlling control unit 300.

A battery 90 supplies electric power to the first communication unit 100, the second communication unit 200 and the processing unit 201. The CPU 202 (including a function as a display control means for controlling to change display contents of the display 30 in accordance with operations of the operation key set 11) performs predetermined control for the first communication unit (also referred to as the radio unit) 100, the second communication unit (also referred to as the radio unit) 200, and the processing unit 201. Furthermore, by the control of the CPU 202, the display-element-deterioration-controlling control unit 300 in cooperation (collaboration) therewith performs predetermined control for the processing unit 201. It should be noted that, when the display-element-deterioration-controlling control unit 300 is functionally described, the control unit 320 includes the CPU 202 (see FIG. 5 to be described later). The display-element-deterioration-controlling control unit 300 including the CPU 202 is also hereinafter referred to as the control unit 320 for convenience.

The first communication unit 100 includes: an antenna unit 81 that, for example, communicates by phone, communicates by mail, or downloads a web page having a predetermined URL from the Internet, with other communication terminals via a base station, based on a predetermined communication method (mobile communication network conforming with, for example, CDMA (Code Division Multiple Access) 2000_1x or the like); and a communication processing unit 101 that is configured with a transmitting circuit and a receiving circuit (not shown).

Moreover, the second communication unit 200 includes: an antenna unit 80 (main antenna) that, for example, communicates by phone, communicates by mail, or downloads a web page having a predetermined URL from the Internet, with other communication terminals via a base station, based on a predetermined communication method (IEEE802.11 conforming with, for example, wireless LAN or the like); and a communication processing unit 203 that is configured with a transmitting circuit and a receiving circuit (not shown).

In addition, the processing unit 201 includes: the operation key set (input operation unit) 11; the microphone 12; the display (display unit) 30 such as LCD and OLED; the sound output unit 31; memory 204 that stores predetermined data; a sound processing unit 205 that performs predetermined sound processing; an image processing unit 206 that performs predetermined image processing; the camera unit 23 that captures an image of an object; a speaker 207 that outputs ringtones, etc., and the like Next, a configuration of the display-element-deterioration-controlling control unit 300 for controlling deterioration (burn-in) (for equalizing deterioration and decreasing the speed of the deterioration) of display elements constituting the display of the present invention is described.

It should be noted that, in the following description, although the memory unit is not physically provided within the control unit 320 in essence, a processing program of the display-element-deterioration-controlling control unit 300 is processed in the control unit 320 by using a work area in the memory. Since a storage area is appropriately provided in the memory, the processing program is illustrated such that the control unit 320 virtually includes the storage area.

Figure 5:
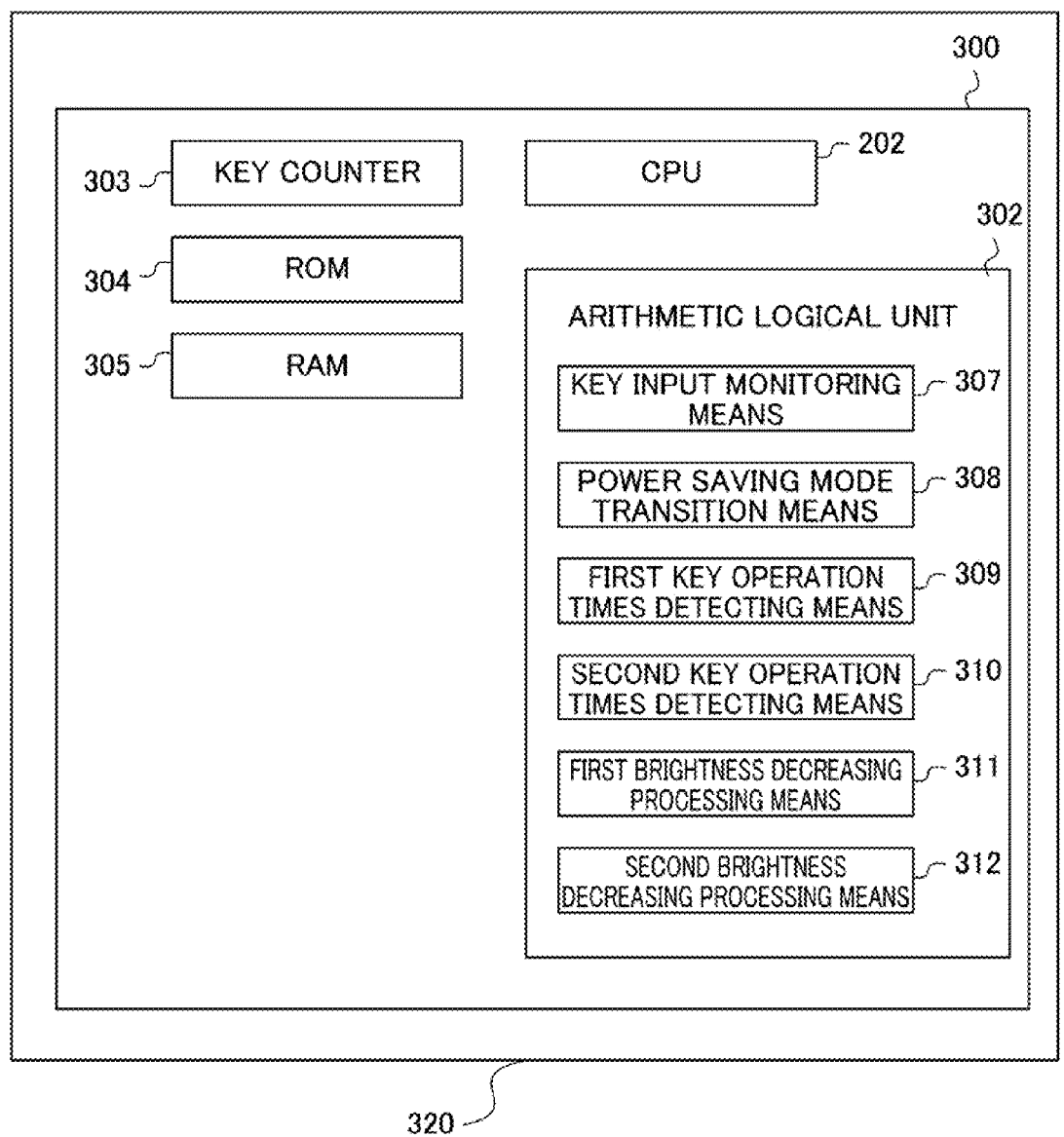
FIG. 5 is a diagram illustrating a configuration of a display-element-deterioration-controlling control unit.

As shown in FIG. 5, the display-element-deterioration-controlling control unit 300 includes at least the CPU 202, an arithmetic logical unit 302, memory units (a key counter 303, ROM 304 and working RAM 305) and input-output means (not shown). The arithmetic logical unit 302 functions as a means for various functional means as described above or later.

The arithmetic logical unit 302 includes, as the functional means, a key input monitoring means 307, a power saving mode transition means 308, a first key operation times detecting means 309, a second key operation times detecting means 310, a first brightness decreasing processing means 311, and a second brightness decreasing processing means 312.

The CPU 202 controls the display-element-deterioration-controlling control unit 300, namely the entire control unit 320, in accordance with a program stored in the ROM 304. The ROM 304 stores a program for performing display element deterioration control. The working RAM 305 is a storage area to be temporarily used by the CPU 202 and the arithmetic logical unit 302 when executing the program.

The key input monitoring means 307 monitors a period of time during which the input operation unit 11 is not operated. In a case in which the key input monitoring means 307 detects that the input operation unit 11 is not operated for a predetermined period of time, the power saving mode transition means 308 causes the display unit 30 to transition into a power saving mode (for example, in a case in which the display unit 30 is an LCD, a backlight is darkened, and in a case in which the display unit 30 is an OLED, the luminescence brightness of the light emitting elements is decreased). Furthermore, in any of the above cases, the display itself may be turned off.

The first key operation times detecting means 309 detects whether an operation of keys among the input keys (a plurality of keys configuring the input operation unit 11) other than first predetermined keys (the outgoing call key 14a or the call end key 14b, for example) is continuously performed for at least a predetermined number of times.

In a case in which the first key operation times detecting means 309 detects that an operation of keys among the aforementioned input keys other than the first predetermined keys is continuously performed for at least a predetermined number of times, the first brightness decreasing processing means 311 performs brightness decreasing processing such that, at least in the display area of the display unit 30, brightness or display gradation of a second area (notification information display area), in which operation contents of the input operation unit 11 are not reflected, is decreased as compared to a first area, in which operation contents of the input operation unit 11 are reflected. Moreover, the first area may be turned off. It should be noted that the notification information display area includes, for example: a radio wave pictograph (pictographic symbol) 331 showing a radio wave state of the radio unit; a mail symbol 334 showing that there is a mail message for which the contents have not been displayed yet on the display unit 30 among mail messages received by the radio unit 100 or 200; a battery symbol 330 showing the charge of the battery; a date pictograph 332; a time pictograph 333; and the like (see FIG. 6).

The second key operation times detecting means 310 detects whether an operation of keys of the second predetermined keys (for example, the numeric keys 14d, the direction key (up-down-left-right key) 15a, and the selection operation key 15b) among the input keys has been continuously performed at least for a predetermined number of times. In a case in which the second key operation times detecting means 310 detects that an operation of keys of the second predetermined keys among the aforementioned input keys has been continuously performed for at least a predetermined number of times, the second brightness decreasing processing means 312 performs brightness decreasing processing such that brightness or display gradation of the second display area, which is a display area other than a display area for performing display in accordance with operations of a predetermined application program, is decreased or the light thereof is turned off as compared to the first display area, which is the display area for performing display in accordance with operations of the predetermined application program.

Figure 6:
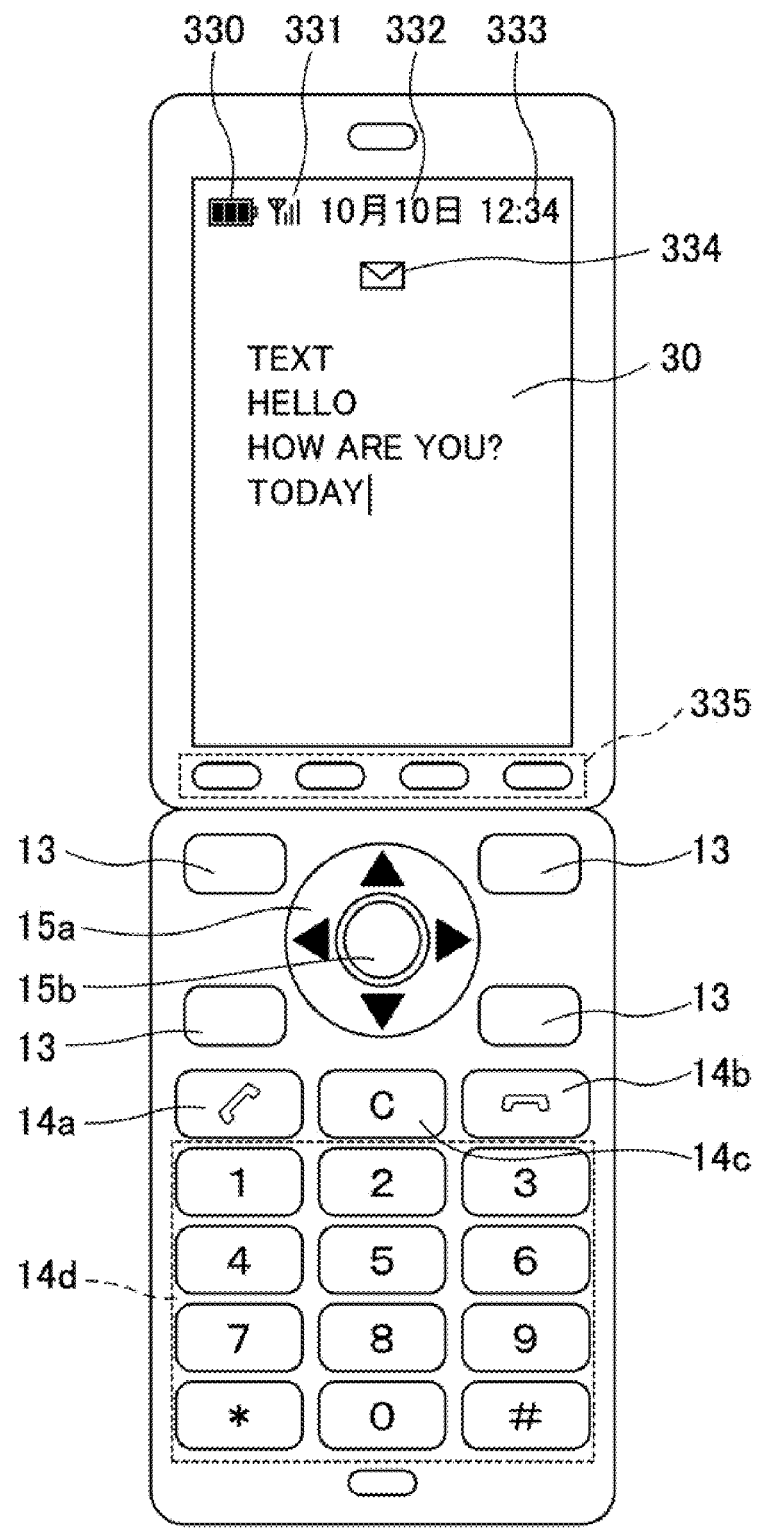
FIG. 6 is a diagram showing a key layout and a display example of a display unit of the cellular telephone device.

FIG. 6 is a diagram showing a key layout and a display example of the display unit 30 of the cellular telephone device 1. It should be noted that the cellular telephone device 1 is schematically shown in FIG. 6 for convenience. In recent years, in most cellular telephone devices, functions other than the function of a telephone are most often used. Examples of a scene in which the user operates the keys for a long time include an edit session such as mail creation or schedule input, and an occasion for using application functions such as a calculator or a game. In such a case, keys that are frequently and continuously used by the user include: the numeric keys 14d for inputting characters; the up-down-left-right key 15a for moving the cursor on the display image; and the selection operation key 15b. Thereafter, it can be estimated that the clear key 14c and the function keys 13 are frequently used.

The clear key 14c is a key for deleting or invalidating contents that are previously operated. The function keys 13 are keys that enable direct transition to a particular mode, or enable a function in accordance with operation contents. It should be noted that a predetermined application program can be allocated to the function keys 13 by a user operation. In contrast, the outgoing call key 14a and the call end key 4b are scarcely used except for terminating editing or an application function or interrupting those by an incoming call. It should be noted that, in the present embodiment, dedicated keys 325 are provided, to which application programs are allocated, and a predetermined application is immediately launched (started) by an operation (a single depressing operation).

On the other hand, on the display unit 30 of the cellular telephone device 1, generally, the battery pictograph 330 for displaying the charge of the battery, the radio wave pictograph 331 showing a radio wave state, the date pictograph 332, the time pictograph 333, the mail pictograph 334 for indicating the presence of an unread mail message and the like are statically displayed, and are always statically displayed on the display unit 30 by the control of the CPU 202 unless intentionally deleted by a key operation or the like by the user. However, regarding these static displays (pictographs), for example, it is not particularly necessary to always display the charge of the battery when the charge of the battery is sufficient, and it is not necessary to always display the date and time as well. Moreover, it is not necessary to always display the radio wave state as well, except for a time for using the function of a telephone.

In the present invention, such pictograph displays, which are not necessary to be always displayed, and other displays, which are not necessary to be displayed when using various functions of the cellular telephone device 1, are displayed in a faint color or turned off, thereby attempting to equalizing deterioration of the display device that configures the display unit 30 and to decrease the speed of the deterioration.

A detailed description is hereinafter made based on three embodiments. It should be noted that, since the configuration for each embodiment is the same (already described above), operations are described with reference to flowcharts of FIGS. 7 to 9.

First Embodiment

Figure 7:
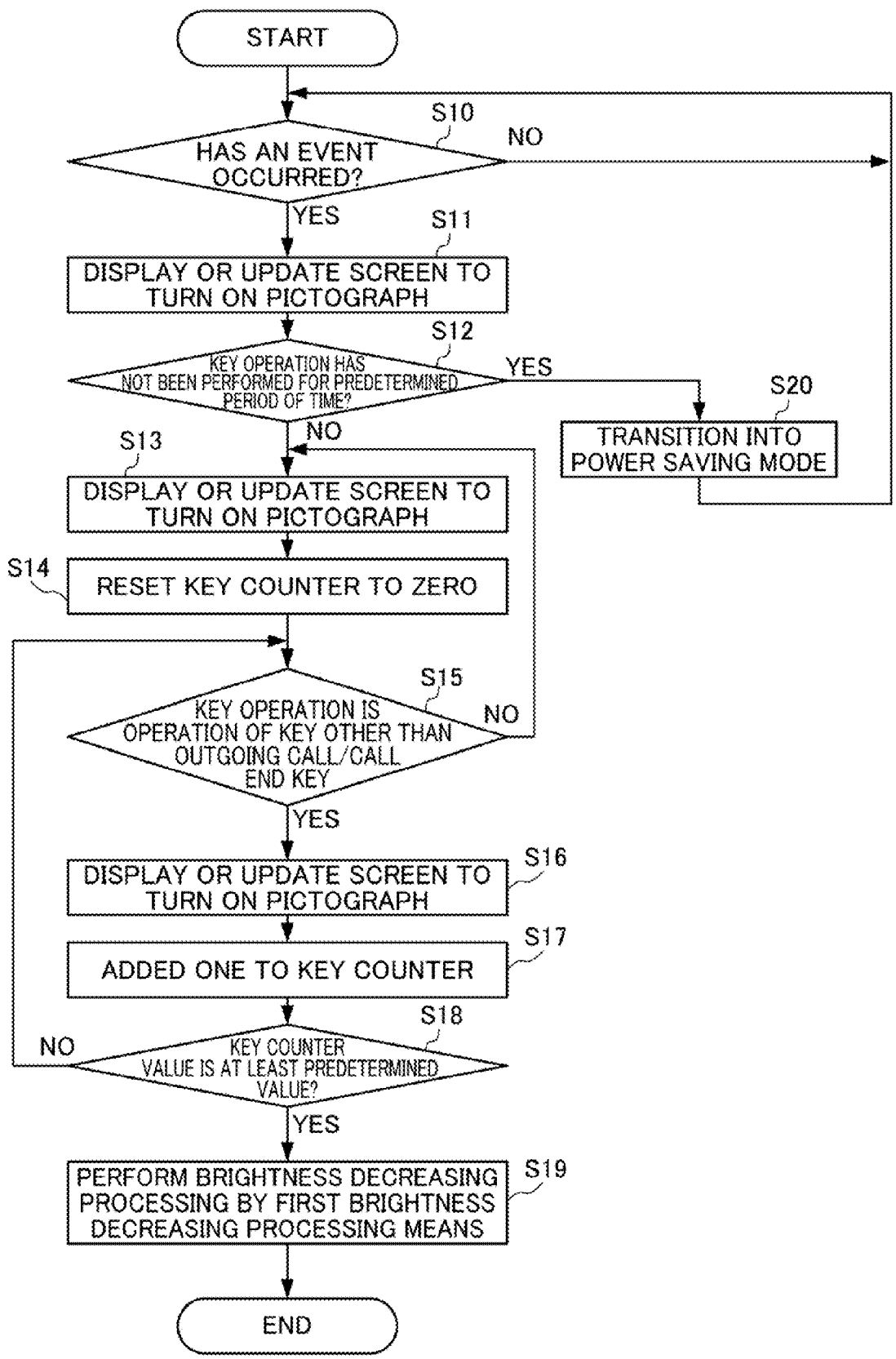
FIG. 7 is a flowchart illustrating a first embodiment of the present invention.

FIG. 7 is a flowchart illustrating a first embodiment of the present invention. For example, in a case in which the user is continuously using (operating) keys other than the outgoing call key 14a or the call end key 14b, it can be estimated that the user is playing a game or performing an edit session with the cellular telephone device 1. Therefore, an area of the display unit 30 that is not related to the game or the edit session can be turned off (the light thereof can be turned off). The first embodiment attempts to equalize deterioration of the display device that configures the display unit 30, and to decrease the speed of the deterioration, by performing this processing (operation).

First, in Step S10, the display-element-deterioration-controlling control unit 300 (control unit 320) determines whether any event such as performing a key operation or receiving an incoming call has occurred when the cellular telephone device 1 is made into the opened state. In a case in which it is determined that no event has occurred, the processing proceeds to Step S10, and in a case in which it is determined that an event has occurred, the processing proceeds to Step S11.

In Step S11, the control unit 320 displays or updates the screen of the display unit 30 to turn on a pictograph (pictographic symbol). It should be noted that, in this step, brightness decreasing processing is not performed, but the entire screen is displayed with brightness that has been set in advance by the user operation. Thereafter, the processing proceeds to Step S12.

In Step S12, the control unit 320 examines whether a key operation from the input operation unit 11 has not been performed for a predetermined period of time. In a case in which it is determined that an operation has not been performed, the processing proceeds to Step S20 in which the display unit 30 transitions into the aforementioned power saving mode, and the processing proceeds to Step S10. In a case in which it is determined that an operation has been performed during the predetermined period of time, the processing proceeds to Step S13.

In Step S13, the control unit 320 displays or updates the screen of the display unit 30 to turn on a pictograph. Thereafter, the processing proceeds to Step S14 in which the key counter is reset to zero, and the processing proceeds to Step S15.

In Step S15, the control unit 320 examines whether the performed key operation is an operation of a key other than the outgoing call/call end key. In a case in which it is determined that the key operation is an operation of the outgoing call/call end key, the processing proceeds to Step S13. In a case in which it is determined that the key operation is an operation of a key other than the outgoing call/call end key, the processing proceeds to Step S16.

In Step S16, the control unit 320 displays or updates the screen of the display unit 30 to turn on a pictograph. Thereafter, the processing proceeds to Step S17 in which one is added to the key counter, and the processing proceeds to Step S18.

In Step S18, the control unit 320 examines whether the key counter value is at least a predetermined value. In a case in which it is determined that the key counter value is below the predetermined value, the processing proceeds to Step S15. In a case in which it is determined that the key counter value is at least the predetermined value, the processing proceeds to Step S19.

In Step S19, the control unit 320 performs brightness decreasing processing by the first brightness decreasing processing means 311, and terminates the processing.

Second Embodiment

Figure 8:
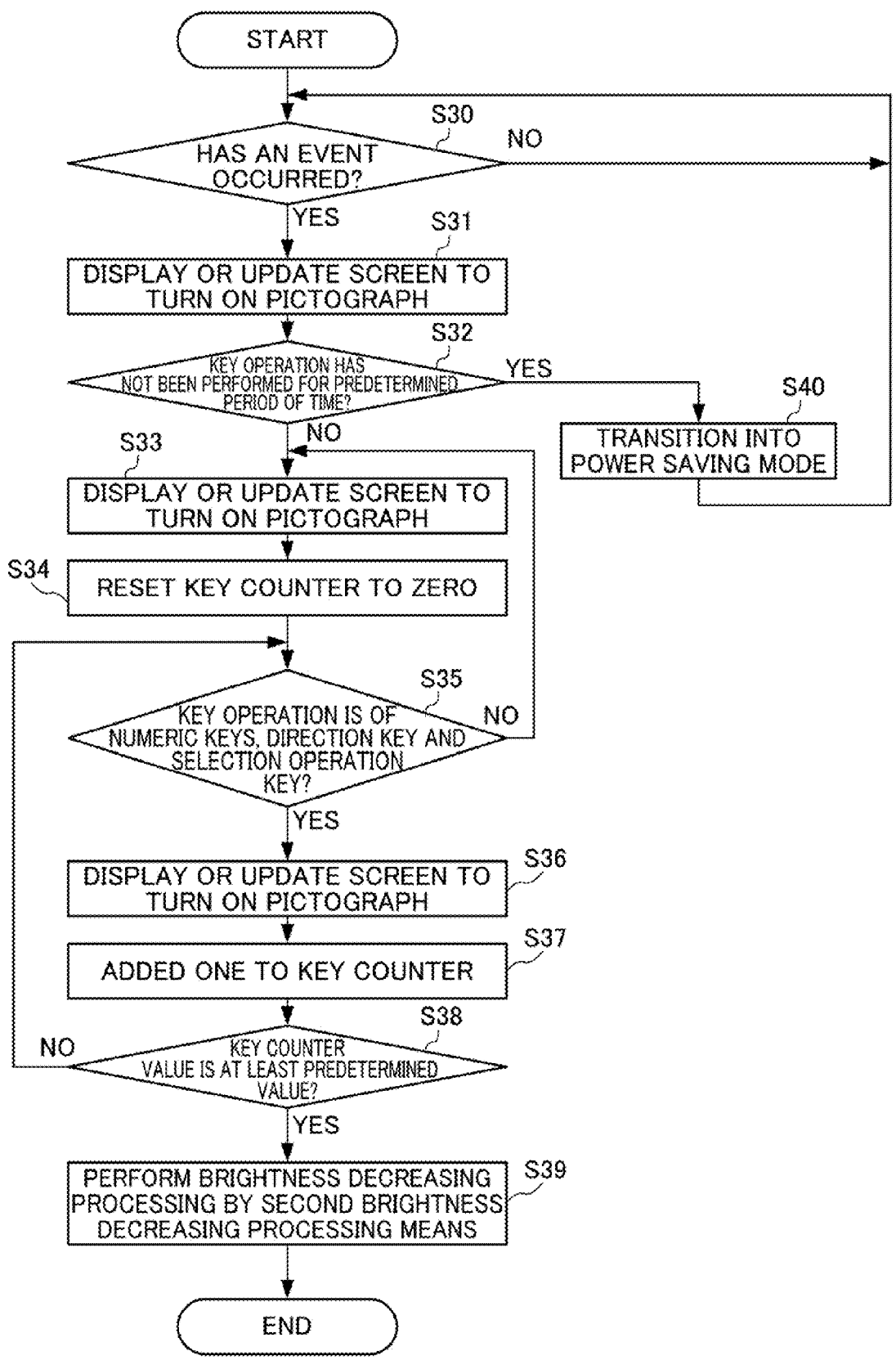
FIG. 8 is a flowchart illustrating a second embodiment of the present invention.

FIG. 8 is a flowchart illustrating a second embodiment of the present invention. For example, in a case in which the user is continuously using (operating) the numeric keys 14d, the direction key 15a and the selection operation key 15b, it can be estimated that the user is using an application function or performing an edit session with the cellular telephone device 1. Therefore, an area of the display unit 30 that is not related to the use of the application function or the edit session can be turned off (the light thereof can be turned off). The second embodiment attempts to equalize deterioration of the display device that configures the display unit 30, and to decrease the speed of the deterioration, by performing this processing (operation).

First, in Step S30, the control unit 320 determines whether any event such as performing a key operation or receiving an incoming call has occurred when the cellular telephone device 1 is made into the opened state. In a case in which it is determined that no event has occurred, the processing proceeds to Step S30, and in a case in which it is determined that an event has occurred, the processing proceeds to Step S31.

In Step S31, the control unit 320 displays or updates the screen of the display unit 30 to turn on a pictograph. Thereafter, the processing proceeds to Step S32.

In Step S32, the control unit 320 examines whether a key operation from the input operation unit 11 has not been performed for a predetermined period of time. In a case in which it is determined that an operation has not been performed, the processing proceeds to Step S40 in which the display unit 30 transitions into the aforementioned power saving mode, and the processing proceeds to Step S30. In a case in which it is determined that an operation has been performed during the predetermined period of time, the processing proceeds to Step S33.

In Step S33, the control unit 320 displays or updates the screen of the display unit 30 to turn on a pictograph. It should be noted that, in this step, brightness decreasing processing is not performed, but the entire screen is displayed with a brightness that was set in advance by the user operation. Thereafter, the processing proceeds to Step S34 in which the key counter is reset to zero, and the processing proceeds to Step S35.

In Step S35, the control unit 320 examines whether the performed key operation is a key operation of the numeric keys 14d, the direction key 15a and the selection operation key 15b. In a case in which it is determined that the key operation is not a key operation of the numeric keys 14d, the direction key 15a and the selection operation key 15b, the processing proceeds to Step S33. In a case in which it is determined that the key operation is a key operation of the numeric keys 14d, the direction key 15a and the selection operation key 15b, the processing proceeds to Step S36.

In Step S36, the control unit 320 displays or updates the screen of the display unit 30 to turn on a pictograph. Thereafter, the processing proceeds to Step S37 in which one is added to the key counter, and the processing proceeds to Step S38.

In Step S38, the control unit 320 examines whether the key counter value is at least a predetermined value. In a case in which it is determined that the key counter value is below the predetermined value, the processing proceeds to Step S35. In a case in which it is determined that the key counter value is at least the predetermined value, the processing proceeds to Step S39.

In Step S39, the control unit 320 performs brightness decreasing processing by the second brightness decreasing processing means 312, and terminates the processing.

Third Embodiment

Figure 9:
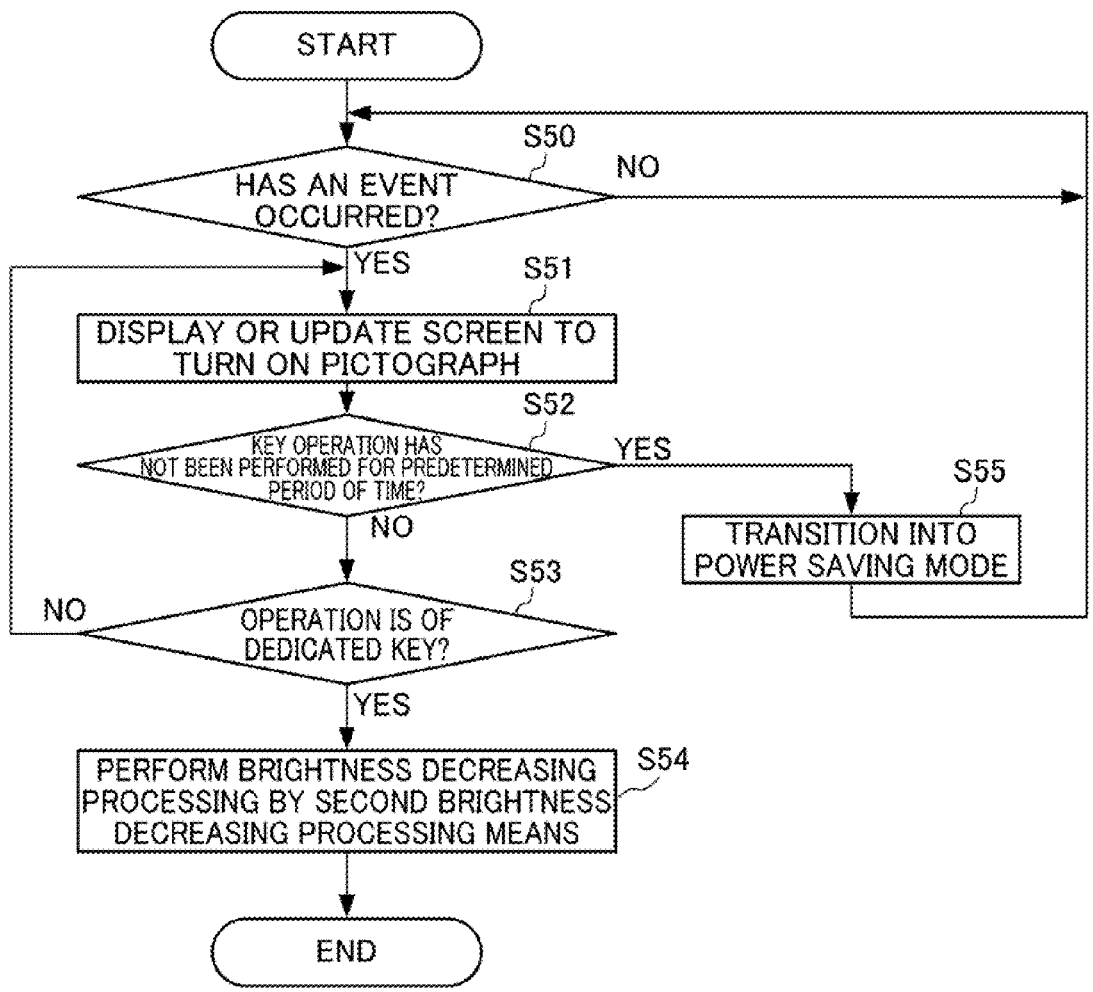
FIG. 9 is a flowchart illustrating a third embodiment of the present invention.

FIG. 9 is a flowchart illustrating a third embodiment of the present invention. For example, in a case in which an application program is allocated to any of the function keys 13 or the dedicated keys 335 in order to facilitate the user to execute the application program, it is known which application program is selected when any of the function keys 13 or the dedicated keys 335 is operated. In other words, it is known which of the first area (first display area) and the second area (second display area) has been selected. Therefore, since it is known which area of the display unit 30 is not related to the use of the application program, the display of such an area can be immediately turned off (the light thereof can be turned off). The third embodiment attempts to equalize deterioration of the display device that configures the display unit 30, and to decrease the speed of the deterioration, by immediately performing this processing (operation) when any of the function keys 13 or the dedicated keys 335 is operated.

First, in Step S50, the control unit 320 determines whether any event such as performing a key operation or receiving an incoming call has occurred when the cellular telephone device 1 is made into the opened state. In a case in which it is determined that no event has occurred, the processing proceeds to Step S50, and in a case in which it is determined that an event has occurred, the processing proceeds to Step S51.

In Step S51, the control unit 320 displays or updates the screen of the display unit 30 to turn on a pictograph. It should be noted that, in this step, brightness decreasing processing is not performed, but the entire screen is displayed with a brightness that was set in advance by the user operation. Thereafter, the processing proceeds to Step S52.

In Step S52, the control unit 320 examines whether a key operation from the input operation unit 11 has not been performed for a predetermined period of time. In a case in which it is determined that an operation has not been performed, the processing proceeds to Step S55 in which the display unit 30 transitions into the aforementioned power saving mode, and the processing proceeds to Step S50. In a case in which it is determined that an operation has been performed during the predetermined period of time, the processing proceeds to Step S53.

In Step S53, the control unit 320 examines whether the performed key operation is an operation of the function keys 13 or the dedicated keys 325. In a case in which it is determined that the key operation is not a key operation of the function keys 13 or the dedicated keys 325, the processing proceeds to Step S51. In a case in which it is determined that the key operation is a key operation of the function keys 13 or the dedicated keys 325, the processing proceeds to Step S54.

In Step S54, the control unit 320 performs brightness decreasing processing by the second brightness decreasing processing means 312, and terminates the processing.

As described above, the present invention has the following effects.

According to the embodiments of the present invention, in a case in which the user is performing a key operation for a long time in an operational portable electronic device, the display area that is not used by such an application can be automatically made darker or the light thereof can be turned off, without the user particularly being aware of this. This makes it possible to equalize deterioration (burn-in) of the display device that configures the display unit, and to decrease the speed of the deterioration.

Although embodiments of the present invention have been described above, the present invention is not limited thereto.

In other words, the brightness decreasing processing may be discontinued in a case in which an interrupting event such as an incoming call has occurred, or in a case in which the user has operated the outgoing call/call end key. Moreover, the brightness decreasing processing may also be discontinued in a case in which an event (a state transition or the like) requiring the user's attention has occurred, for example, such as a case in which the charge of the battery has decreased or the radio wave state has deteriorated. Furthermore, in the embodiments, although the brightness of the display area is decreased or the light thereof is turned off, a predetermined operation (such as changing a color) may be performed such that the extent of the burn-in is alleviated.

The invention claimed is:

1. A portable electronic device, comprising:
   an input operation unit including a plurality of input keys;
   a display unit; and
   a control unit that controls to change display contents of the display unit based on an instruction of the input operation unit,
   wherein the display unit includes a first area in which operation contents of the input operation unit are reflected, and a second area in which the operation contents are not reflected, and
   wherein, upon detecting that a key operation other than a first key among the input keys has been continuously performed for at least a predetermined number of times, the control unit performs first brightness decreasing processing such that brightness or gradation of at least the second area of the display unit is decreased as compared to brightness or gradation of the first area.

2. The portable electronic device according to claim 1, wherein the first key is an outgoing call key or a call end key.

3. The portable electronic device according to claim 1, wherein, when a state in which the input operation unit is not operated continues for a predetermined period of time, the control unit controls the display unit to transition into a power saving mode that involves second brightness decreasing processing for decreasing brightness of the entire display unit or non-displaying processing for not performing display.

4. The portable electronic device according to claim 3, wherein, when the power saving mode is canceled, the control unit causes display to be performed in a state in which the first brightness decreasing processing is canceled.

5. The portable electronic device according to claim 1, wherein the second area is a notification information display area for making notification of a state of the device.

6. The portable electronic device according to claim 5, further comprising a radio unit, wherein the control unit controls the display unit to perform display on the notification information display area to include at least one symbol among a radio wave symbol showing a radio wave state of the radio unit, and a mail symbol showing presence of a mail message for which contents thereof have not yet been displayed on the display unit after being received by the radio unit.

7. The portable electronic device according to claim 5, further comprising a battery, wherein the control unit controls the display unit to perform display on the notification information display area to include a battery symbol showing a charge of the battery.

8. The portable electronic device according to claim 5, wherein the control unit controls the display unit to perform display on the notification information display area to include at least one symbol among a date symbol and a time symbol.

9. The portable electronic device according to claim 1,
wherein the display unit is configured with a multitude of pixels including a plurality of light emitting elements, the pixels disposed in length and width directions, and
wherein the control unit changes display contents of the display unit by controlling a light emission state of each of the multitude of pixels.

10. A portable electronic device, comprising:
a display unit that includes a first display area on which display is performed in accordance with an operation of a predetermined application program and a second display area outside the first display area;
a control unit that controls to change display contents of the display unit; and
an input operation unit that includes a plurality of input keys including a predetermined key for outputting an operation signal to the predetermined application program,
wherein, in a case where a key operation of the predetermined key being continuously performed for at least a predetermined number of times has been detected, the control unit performs brightness decreasing processing such that brightness of the second display area is decreased as compared to brightness of the first display area, or the second display area is turned off.

11. The portable electronic device according to claim 10, wherein the predetermined key is at least one among a numeric key, a direction key and a selection operation key.

12. The portable electronic device according to claim 10, wherein, in a case in which there is a dedicated key allocated to startup of the application program in setting by the input operation unit or in an initial state, the control unit performs the brightness decreasing processing corresponding to the application program allocated to the dedicated key when an operation of the dedicated key occurs.

13. The portable electronic device according to claim 10, wherein the control unit discontinues the brightness decreasing processing when an event for which notification should be made occurs in a state in which the brightness decreasing processing is performed.

14. The portable electronic device according to claim 10,
wherein the display unit is configured with a multitude of pixels including a plurality of light emitting elements, the pixels disposed in length and width directions, and
wherein the control unit changes display contents of the display unit by controlling a light emission state of each of the multitude of pixels.

15. The portable electronic device according to claim 10, further comprising a radio unit,
wherein the control unit controls the display unit to perform display on the notification information display area to include at least one symbol among a radio wave symbol showing a radio wave state of the radio unit, and a mail symbol showing presence of a mail message for which contents thereof have not yet been displayed on the display unit after being received by the radio unit.

16. The portable electronic device according to claim 10, further comprising a battery,
wherein the control unit controls the display unit to perform display on the notification information display area to include a battery symbol showing a charge of the battery.

17. A display control method for a portable electronic device including: an input operation unit including a plurality of input keys; and a display unit that changes display contents based on an instruction of the input operation unit, the method comprising the steps of:
displaying, on the display unit, a first area in which operation contents of the input operation unit are reflected;
displaying, on the display unit, a second area in which operation contents of the input operation unit are not reflected;
determining whether a key operation other than a first key among the input keys has been continuously performed for at least a predetermined number of times; and
performing first brightness decreasing processing such that brightness or gradation of at least the second area of the display unit is decreased as compared to brightness or gradation of the first area, upon determining that a key operation other than the first key has been continuously performed for at least a predetermined number of times.

* * * * *